Figure 1:
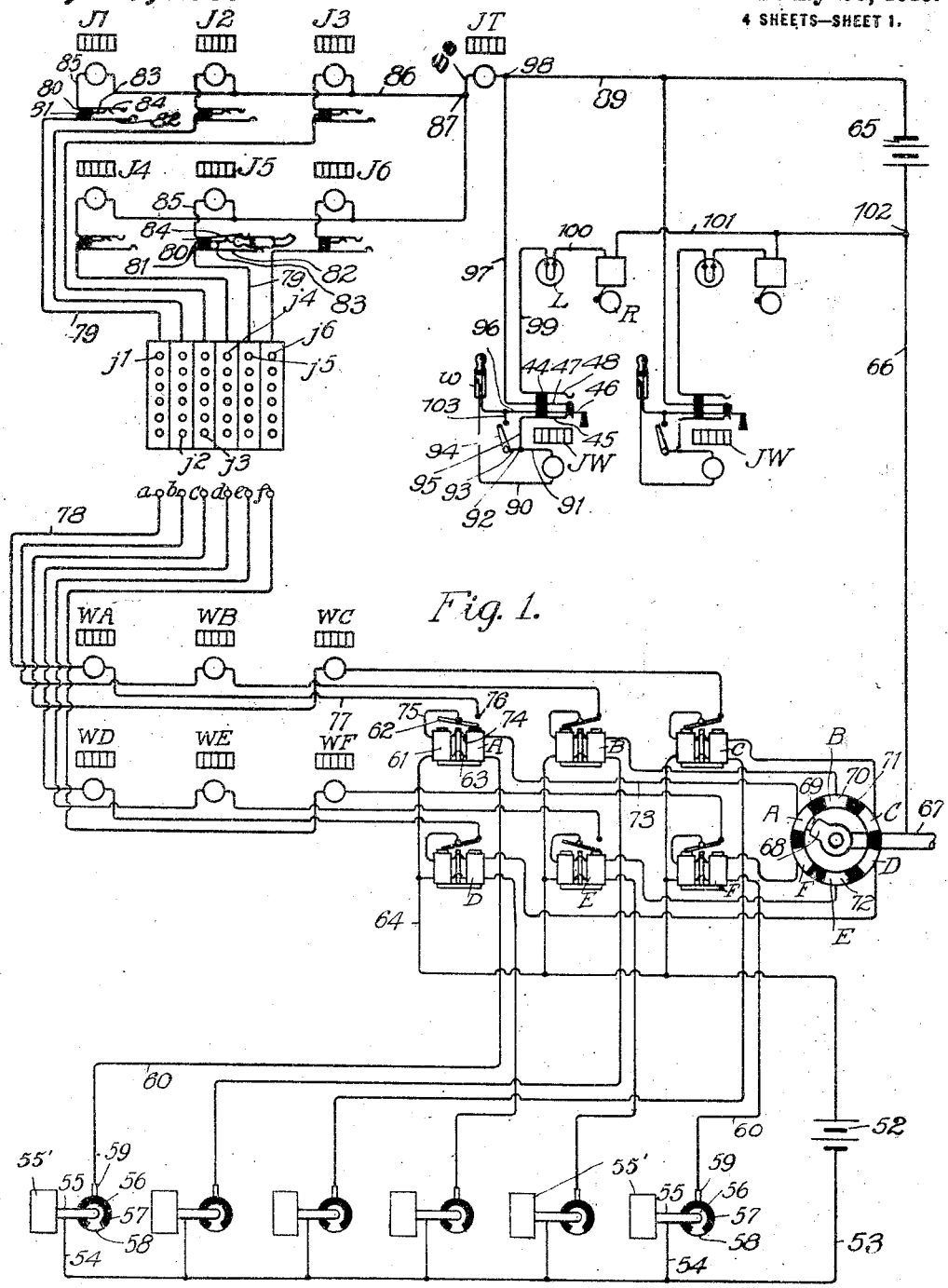

F. O. HEUSER.
ACCOUNTING SYSTEM.
APPLICATION FILED JUNE 7, 1909. RENEWED DEC. 11, 1914.

1,147,020.

Patented July 20, 1915.
4 SHEETS—SHEET 1.

Witnesses:
Leonard W. Novander
George E. Higham

Inventor
Frederick O. Heuser
By Browne Williams
Attorneys

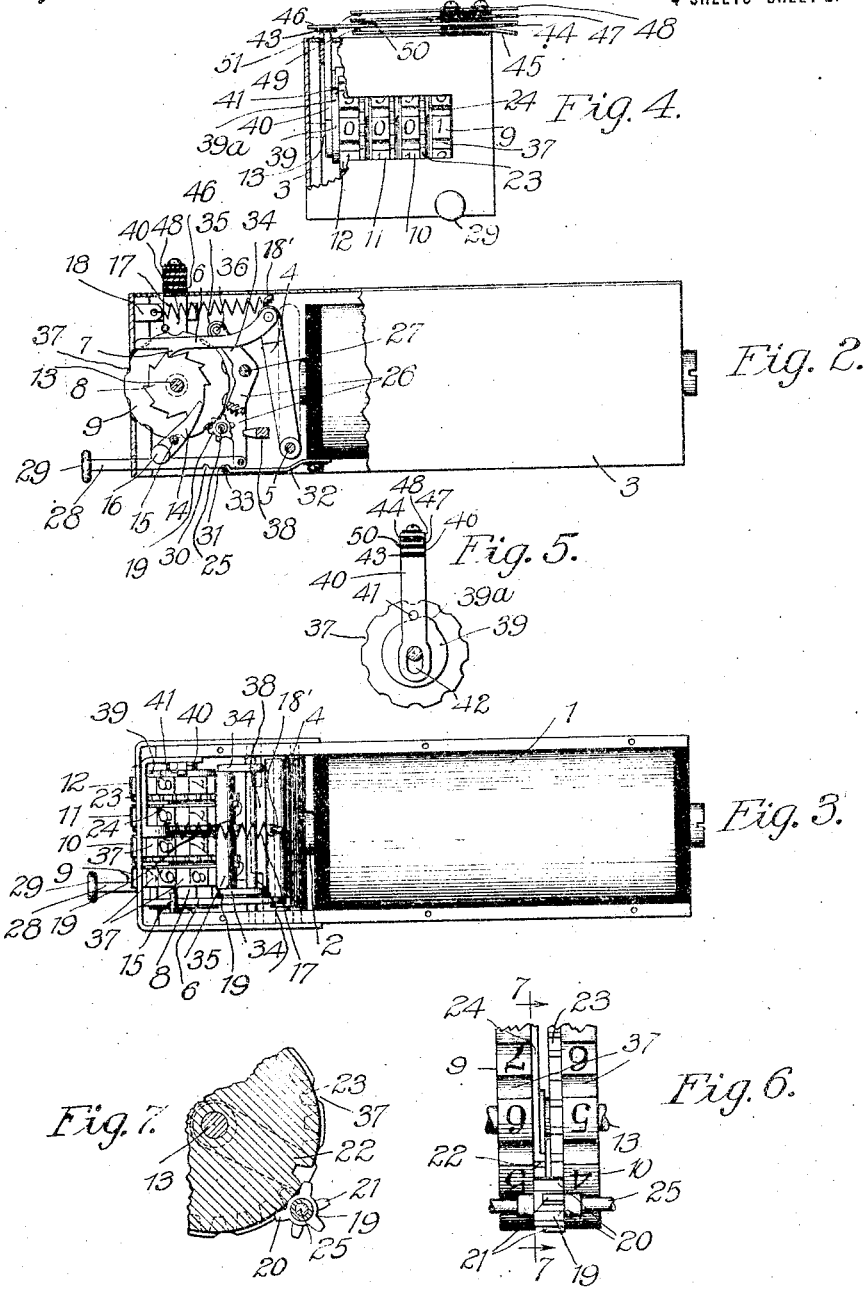

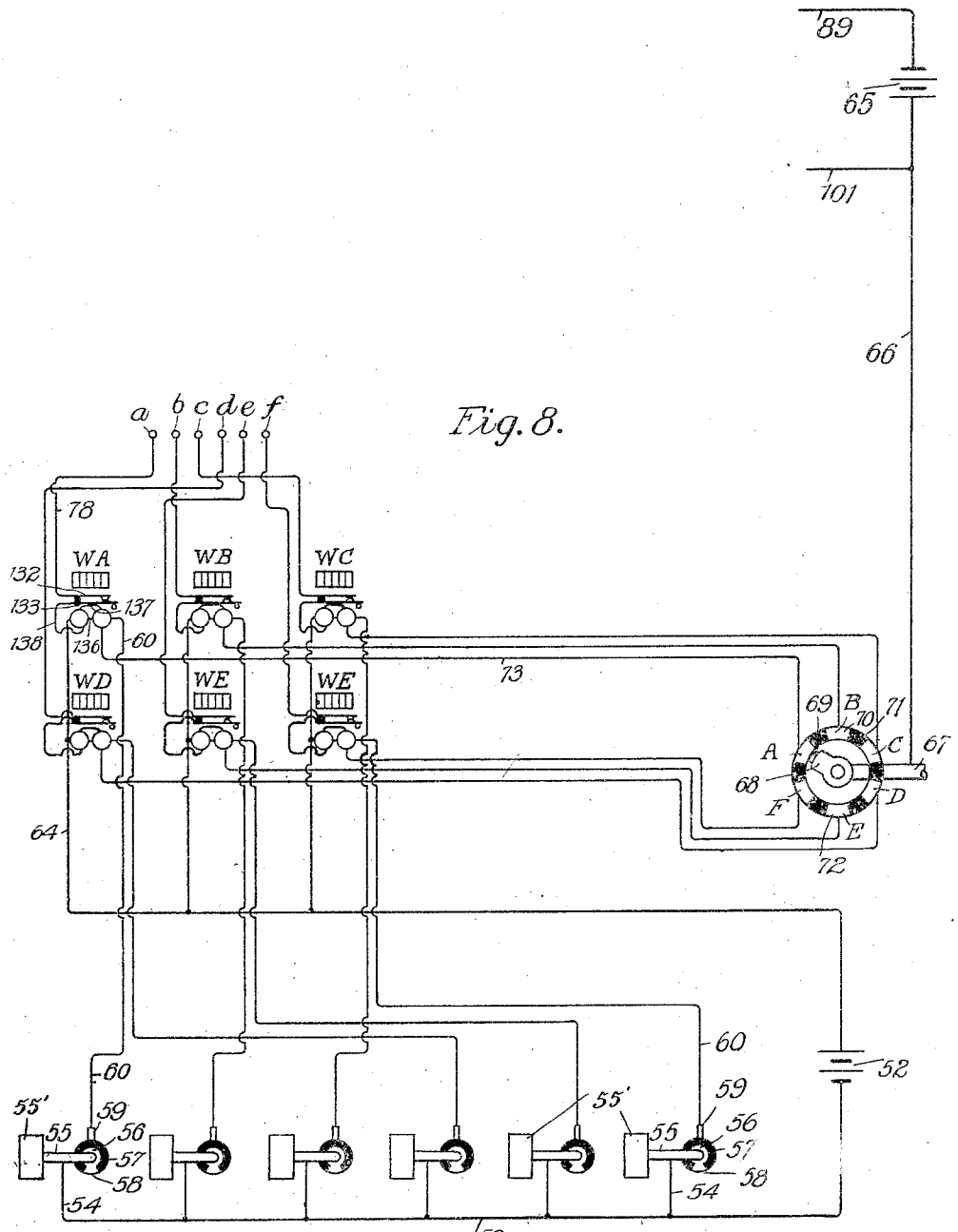

F. O. HEUSER.
ACCOUNTING SYSTEM.
APPLICATION FILED JUNE 7, 1909. RENEWED DEC. 11, 1914.
1,147,020.
Patented July 20, 1915.
4 SHEETS—SHEET 4.
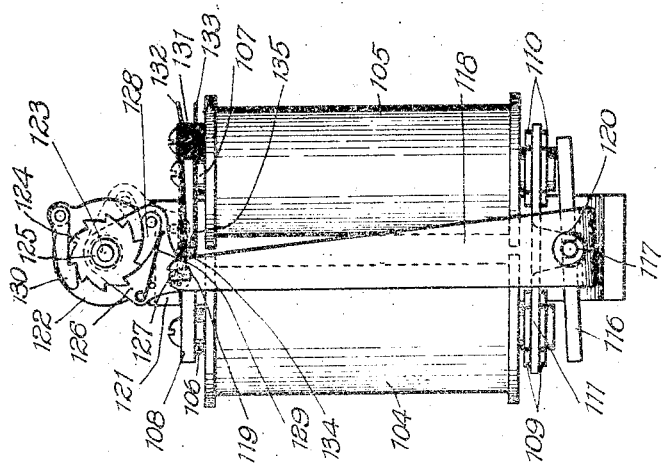
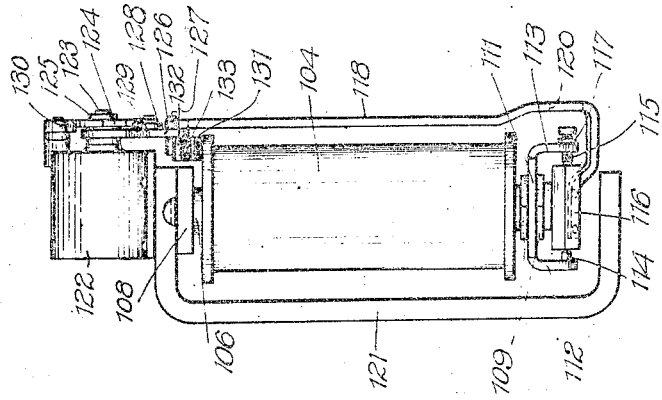
Witnesses:
Inventor
Frederick O. Heuser,
By
Attorneys

UNITED STATES PATENT OFFICE.

FREDERICK O. HEUSER, OF CHICAGO, ILLINOIS, ASSIGNOR, BY MESNE ASSIGNMENTS, TO WILLIAM R. HEATH, OF BUFFALO, NEW YORK.

ACCOUNTING SYSTEM.

1,147,020.

Specification of Letters Patent.

Patented July 20, 1915.

Application filed June 7, 1909, Serial No. 500,526. Renewed December 11, 1914. Serial No. 876,741.

*To all whom it may concern:*

Be it known that I, FREDERICK O. HEUSER, a citizen of the United States, residing at Chicago, in the county of Cook and State of Illinois, have invented certain new and useful Improvements in Accounting Systems, of which the following is a full, clear, concise, and exact description, reference being had to the accompanying drawings, forming a part of this specification.

My invention relates to accounting systems and has particular reference to improvements in apparatus for cost distribution in industrial establishments.

My invention has two principal objects mainly in view: first, to provide monitory apparatus by means of which warning may be given when the expenses of any department or of any job have accumulated a certain predetermined amount; second, to provide apparatus by which irregular or intermittent impulses or actuations from one mechanism may be stored and then periodically transferred to the accounting devices or registers.

Although my invention may be carried out by means of strictly mechanical apparatus, I prefer to employ electromagnetic means for accomplishing the results. In order to carry out the monitory system, I employ an auxiliary register which may be manually set for any predetermined amount. This register is then suitably electrically connected so that as the accounting register accumulates this auxiliary register is caused to decumulate the same amount. When the auxiliary register is decumulated to zero, a suitable contact is automatically made so that an electric circuit in which a signaling device is included, such as a bell or light, becomes closed. At the same time, if so desired, the circuit in which the accounting register is included may be automatically broken so that further actuations of this register are stopped.

In order to accomplish the second principal object of my invention, namely the storing of intermittent or irregular impulses, I provide a polarized electromagnetic device which is supplied with two independent windings. One of these windings is in circuit with the source of irregular impulses, whereas the second, by means of a suitable distributing mechanism, is periodically connected with a second source of current which, when connections are made through the actuating devices of the register of the accounting system, will flow through the windings in an opposite direction from that in which the current flows from the sources of irregular impulses.

The polarized electromagnetic device is provided with an armature and is, in reality, a polarized relay. When an impulse comes from the irregular source, the armature, which also acts as a switch, is moved into such a position that an electric connection is made between the distributer and the circuit in which the actuating devices of the registers are included. When the distributer forms a connection with the second source of current, it is evident that an impulse will flow through the entire accounting system associated with any individual workman. The distributer is preferably made with a plurality of conducting segments, these segments being consecutively connected with the source of current, preferably by means of a rotary arm or some similar device. The current after leaving the distributer, passes through the windings of the polarized relay device and the armature is thereby caused to assume its normal position and the circuit in which the distributer and the actuating mechanisms of the registers are included, is thereby broken.

From this description it is evident that in order to transmit an impulse to the actuating mechanisms of the accounting system, there must be an alternate energization of the relay mechanism, first by the intermittent source of impulses and second by the periodic source.

In applying my invention to wage and job accounting systems, the polarized relay may be directly associated with the wage registers and these registers may be actuated on receiving an impulse from the intermittent source of impulses. On the other hand, the job registers, which are included in the same circuit, will be periodically actuated on the flow of impulses from the distributing mechanism.

I have hereinbefore in this specification mentioned chiefly the application of my invention to wage and job accounting systems, but it will be apparent, to those skilled in the science of accounting, that its application is very broad and that it can be used in many industrial fields; for example counting the number of copies turned out by a printing press, the monitory register mentioned above being properly connected and manually set up to correspond to the number of copies which it is desired to print, suitable connection being made so that the printing mechanism would send an impulse through the accounting system as each copy is printed. When the predetermined number have been printed, the auxiliary register will be decumulated to zero and warning may thereby be given to the operator, or, if desired, the machine itself may be automatically stopped when the auxiliary register reaches zero.

It will be evident from the foregoing description that my invention constitutes improvements on the co-pending applications of W. J. Crumpton, Serial No. 437,809; F. O. Heuser, Serial No. 495,717; F. O. Heuser, Serial No. 490,320; A. F. Poole, Serial No. 554,560.

In order to more thoroughly understand the various advantages of my invention reference should be made to the accompanying drawings, in which—

Figure 1 is a diagrammatic representation of my system as a whole, Fig. 2 is a side elevation and partly sectional view of the monitory register and its associated electromagnetic actuating mechanism, Fig. 3 is a plan view, showing the same parts as in Fig. 2, Fig. 4 is a front elevation and partly sectional view of the parts shown in Fig. 2, Fig. 5 is a detailed view of the cam mechanism associated with one of the indicating wheels, as shown in Fig. 4, Fig. 6 is a rear elevation of the units and tens indicating wheels and carry-over pinion shown in Fig. 2, Fig. 7 is a sectional view on the line 7—7 of Fig. 6, Fig. 8 is a diagrammatic representation of the modified form of the system shown in Fig. 1, Fig. 9 is a side elevation of the relay and actuating mechanism associated with the wage registers of Fig. 8, and Fig. 10 is a plan view of the same parts shown in Fig. 9.

In order that the operation of my system may be more thoroughly understood, I will first describe the detailed mechanism which is employed.

In Figs. 2, 3, 4, 5, 6 and 7, the various parts of the warning register and its associated actuating mechanism are represented. 1 represents the windings of an electromagnet having the core 2. The electromagnet and its associated mechanism are mounted within the frame 3. To this frame the armature 4 is pivoted at 5. Pivoted to the free end of the armature 4 is the arm 6 provided with the projection 7 which operates in connection with the ratchet 8. The ratchet 8 is rigidly attached to the units indicating wheel 9 of the register having the indicating wheels 9, 10, 11 and 12. These indicating wheels are loosely mounted on the shaft 13. Coöperating with the ratchet 8 is a pawl 14 pivoted at 15 and provided with the counterbalancing weight 16, the action of which is to keep the pawl in engagement with one of the teeth of the ratchet 8. It is now evident that when the windings 1 of the electromagnet are energized, the armature 4 will be attracted to the position shown in dotted lines and the projection 7 of the arm 6 will move into engagement with the next tooth to the right as shown in Fig. 2, the pawl 14 serving to prevent rotation of the ratchet in a clockwise direction. When the windings 1 are de-energized, the spring 17 having one end attached to the bracket 18, mounted on the frame 3, and the other end attached to the projection 18' on the armature 4, becomes effective and the armature is moved into the position shown in full lines in Fig. 2, the ratchet 8 being thereby rotated in a contra-clockwise direction as shown in Fig. 3. The indicating wheels of the register are provided with cams and gears so that after the units wheel is moved nine spaces, on the tenth movement it may carry with it the tens wheel, which is moved one space. Similarly, after the tens wheel moves nine spaces on the movement of one additional space, the hundreds wheel is moved one space, the same operation also taking place with respect to the hundreds and thousands indicating wheels. The exact manner of accomplishing this result does not form a part of the present invention, but the system may be used which is illustrated in detail in Figs. 6 and 7.

It is evident that each wheel on the side toward the wheel of next higher degree is provided with a cam and on the side toward the wheel of next lower degree, is provided with a gear. Adapted to coöperate with these cams and gears is a carry-over pinion, which, in Fig. 6, is shown as 19. This pinion 19 is provided with teeth 20 extending laterally across the face of the pinion. Alternating with these teeth are teeth 21 which extend only partly across the face of the pinion. It is evident that the cam 22, rigidly attached to the indicating wheel 9 is adapted to be in mesh with one of the teeth 21 of the carry-over pinion. As the indicating wheel 9 is rotated and the cam is brought into mesh with the teeth 21, the carry-over pinion will be rotated one space, and inasmuch as the gear 23 of the indicating wheel 10 is in mesh with both the teeth 20 and the teeth 21 of the carry-over pinion, the indicating wheel 10 will correspondingly be advanced one space. After the cam 22 has been in mesh with a tooth 21 and moved the carry-over pinion one space, it is clear that the portion 24, rigidly attached to the periphery of the wheel 9, will occupy the space between the end of the tooth 21 and the edge of the carry-over pinion.

Referring now to Figs. 2 and 3, it will be seen that the carry-over wheels 19 are loosely mounted on a rod 25, this rod, in turn, being supported by the upright frame members 26, which are pivoted at 27. Pivotally connected to the lower end of one of the members 26 is the rod 28 provided with a handle 29. In this rod are two notches 30 and 31. A spring 32 is rigidly mounted on the frame of the electromagnet and on its free end is bent to form an angular portion 33. It is clear that the spring 32 by means of its angular end 33, which coöperates with the notches 30 and 31 of the rod 28, serves to hold this rod in the position in which it is adjusted.

The upper parts of the upright frame members 26 form the extensions 34 and carry between them the sleeve 35 which is loosely mounted on the rod 36.

The indicating wheels 9, 10, 11 and 12 are provided with lateral grooves 37. When the handle 29 of the rod 28 is pushed inwardly or to the right, as shown in Figs. 2 and 3, the carry-over pinions 19 are disengaged from the indicating wheels and brought into engagement with the bar 38 rigidly mounted in the frame 3 and thereby the carry-over pinions are prevented from rotating. At the same time the sleeve 35 is engaged in the grooves 37 of the indicating wheels and these wheels are thereby slightly locked against rotation. It is clear, however, that on account of the nature of the retaining action of the angular portion 33 of the spring 32, there will be a certain amount of flexibility or "give" in the engagement of the member 35 with the grooves 37. Inasmuch as the carry-over pinions are disengaged from the indicating wheels, it is clear that the indicating wheels may be moved independently and manually as desired and any predetermined number may readily be set up, the sleeve 35 meanwhile acting to retain the indicating wheels in the proper positions but not exercising a sufficient am    t of resistance so that the wheels will b    revented from being easily operated manually.

Rigidly attached to the thousands indicating wheel 12 of the register is a cam 39, provided with an extension 39ª. A vertical member 40 provided with a pin 41 is adapted to be reciprocated in a vertical direction by means of the action of the projecting portion 39ª of the cam 39 on the pin 41, the member 40 being provided with a slot 42 which is adapted to allow this reciprocation. The member 40 is supported in its normal position by the shaft 13. The member 40 extends upwardly through the frame 3 and is provided on its upper end with an insulating portion 43.

On the upper part of the frame 3 is mounted an insulating block 44. Supported in this block are four switch-blades 45, 46, 47 and 48. The blade 45 is provided near its free end with the contact 49. The blade 46 extends beyond the other three blades and in its normal position forms an electrical connection with the contact 49 of the blade 45. The blade 47 is provided with an insulating block 50 and in its normal position is separated from the contact 51 of the blade 48. The two switch-blades 45 and 46 are included in the same circuit as the energizing windings 1 of the electromagnet and are adapted to make or break this circuit. The switchblades 47 and 48 form part of a signaling circuit which will be described in detail hereafter.

It is now apparent that when the member 40 is in its normal lowered position, the switch-blades 45 and 46 will be in electrical connection, whereas the switch-blades 47 and 48 will normally keep open the circuit in which they are included. When the member 40 is moved upwardly by the action of the cam 39, the blade 46 will be removed from the contact 49 and the energizing circuit of the electromagnet will be broken. On the other hand, the blade 46, being moved upwardly, the blade 47 will be brought into electrical connection with the blade 48 and the signaling circuit will thereby be closed.

Turning now to a description of my system as a whole, as illustrated diagrammatically in Fig. 1, 52 is a battery, to one pole of which is connected the conductor 53. Conductors 54 lead from the main conductor 53 to a number of shafts 55 with which the conductors 54 are in electrical connection. Mounted on each shaft is a rotary disk 56 having on its periphery an insulated segment 57 and a conducting segment 58. Adapted to bear on the periphery of each disk is a brush 59 and leading from each brush is a conductor 60 which leads to the windings of a polarized relay 61 provided with the armature 62. The current after passing through the conductor 60 and the windings of one electromagnet of the polarized relay passes through the conductor 63 to the windings of the second electromagnet and thence through the conductor 64 back to the second pole of the battery 52. The shafts 55 are driven by time controlled mechanism indicated diagrammatically at 55' and the ratio of such driving may in each case be given any desired value.

The disks 56 may be operated at a plurality of rates and if my system is used for wage and job accounting each rate of rotation may correspond to a rate of wages.

From the pole of the battery 65 opposite in sign from that of the battery 52 to which the conductor 53 is connected, a conductor 66 leads to the shaft 67. Mounted on this shaft is a rotating member 68 which, by means of the brush 69 is brought in contact successively with conducting segments 70 and non-conducting segments 71 of the so-called "distributer" 72. One of the conducting segments 70 is assigned to each individual workman. In the diagram provision has been made for six workmen, A, B, C, D, E and F, and the assignment to them of segments has been correspondingly indicated. To each conducting segment is connected a conductor 73 which leads to windings of one of the electromagnets of the polarized relay 61, these windings being independent of those which are described in connection with the circuit in which the conductor 60 was included. The current may be traced from the conductor 73 through the windings of one electromagnet then through the conductor 74 to the windings of the other electromagnet and next through the conductor 75 to the pivotal point of the armature 62.

It is clear that any number of polarized relay mechanisms may be associated with a rate disk 56 and that these rate disks will be simultaneously energized thereby. On the other hand, a polarized relay mechanism is assigned to each individual workman as indicated in the diagram, each of these relay mechanisms being connected by the conductor 73 with the proper segment of the distributer 72. When the circuit from the battery 52 is closed through any one of the polarized relays, the armature 62 is thrown into the position shown in the relays assigned to the workmen B, C, D and F. The armature 62 is thereby brought into contact with a terminal 76 to which the conductor 77 is connected. The current therefore passes from the conductor 75 through the armature 62, the terminal 76 and the conductor 77 to the electromagnetic actuating device associated with the wage register for any individual workman, these wage registers being represented at WA, WB, WC, WD, WE and WF respectively. These actuating mechanisms may be of any suitable type as described, for example, in connection with the co-pending application of William J. Crumpton, Serial No. 437,809, filed June 11, 1908.

From the actuating mechanism associated with any wage register, the current is next traced through the conductor 78 to the plug associated with each workman, these plugs being represented as $a$, $b$, $c$, $d$, $e$, and $f$ respectively. Adapted to receive these plugs are a plurality of series of jacks, a single series being assigned to each job. In Fig. 1, six jobs are represented, the registers assigned to each job being designated as $J^1$, $J^2$, $J^3$, $J^4$, $J^5$ and $J^6$ respectively. The jacks associated with each job register are correspondingly designated as $j^1$, $j^2$, $j^3$, $j^4$, $j^5$ and $j^6$ respectively, the contacts of the jacks of the same series being connected to a single conductor. Let us now assume that the plug $a$ is inserted in one of the jacks $j^1$. The current will be traced through the conductor 79 to the insulating block 80. The conductor 81 is placed in electrical connection with the conductor 79 on the battery side of the insulating block 80. The conductor 79 is connected with a jack terminal 82, the purpose of which will be explained hereafter. The conductor 81 is connected with a spring terminal 83 which is in electrical contact with the jack terminal 84. The current may therefore be traced from the conductor 79 through the conductor 81 and the terminals 83 and 84 to the conductor 85. The current then passes through the electromagnetic actuating mechanism of the register $J^1$ and then through the conductor 86 to the point 87 where it meets a similar conductor associated with the registers $J^4$, $J^5$ and $J^6$. The current next passes through the conductor 88 to the actuating mechanism of the total job register JT. It next goes through the conductor 89 to the second pole of the battery 65 thereby completing the circuit.

Adapted to be brought into association with any one of the registers, as, for example, one of the job registers $J^1$, $J^2$, $J^3$, $J^4$, $J^5$ or $J^6$, may be a monitory or warning register JW. This register and its electromagnetic actuating mechanism have been described above and are illustrated in Figs. 2 to 7 inclusive. The conductor 90 leads from one terminal of the electromagnetic actuating device to the sleeve contact of the plug $w$. A conductor 91 leads from the second terminal to the point 92. From this point a conductor 93 leads to a switch 94, the object of which will be described hereafter. Also leading from the point 92 is a conductor 95 which connects with the terminal 45. As explained in connection with the detailed description of the monitory register and its actuating mechanism, the switch blade 46 is normally in connection with the blade 45 whereas the blades 47 and 48 are normally separated from each other and are included in a different branch of the circuit from that in which the blades 45 and 46 are included. Connected to the switch blade 46 is the conductor 96 which leads to the tip contact of the plug $w$.

The conductor 97 is connected to the conductor 89 at the point 98 and leads to the switch blade 47. To the switch blade 48 is connected the conductor 99 which is connected with a light L. From this light L a conductor 100 leads to the bell R and from the bell a conductor 101 joins the conductor 100

66 at the point 102. It is, therefore, evident that if the blades 47 and 48 are brought into contact the circuit in which the light and bell is included, will be closed.

The operation of my system may now be clearly understood. The rate disks 56 are revolved at rates corresponding to predetermined rates of wages. As the conducting segment of any one of these disks is brought into contact with its corresponding brush, the polarized relay or relays with which the brush is connected by means of its conductor, have their armatures attracted into a position in which an electric connection is made between the conductors 75 and 77 as explained above. When the brush 69 of the distributer reaches the conducting segment for any individual workman, the current flows through the electrically connected polarized relay and through the conductor 77 provided the balance of the circuit is closed. Simultaneously with sending an impulse through the conductor 77, however, the armature 62 is attracted into its normal position and the electrical connection between the conductors 75 and 77 is broken. It is evident, therefore, that in order to send impulses through the conductor 77 there must be alternate energization of the polarized relay. The operation is always conducted so that the speed of rotation of the distributer is much in excess of that of the rate disks. It is evident that, if the conducting segment of a rate disk comes in contact with its corresponding brush and thereby closes the circuit in which the polarized relays are included, no current will flow through the conductor 77, inasmuch as the circuit in which the rate disks are included is entirely distinct from that in which the distributer is included. On the other hand, when there is one impulse coming through the appropriate segment of the distributer to the polarized relay, the subsequent connection of the same segment with the battery will have no further effect on the relay inasmuch as the armature has already been attracted by the action of the current through this same segment into a position by which the electrical connection between the conductors 75 and 77 is broken. It is, therefore, clear that there must always be alternate action of these two currents in order to send an impulse through the conductor 77.

It is, of course, necessary that, in order to actuate any of the wage registers, the plugs associated with these registers must be inserted in jacks associated with job registers, as otherwise the circuit would not be closed. According to the system shown in Fig. 1, the plugs assigned to all six workmen could be inserted in the jacks $j^1$, associated with a single job or the plugs could be inserted so that the wages of all the workmen would be distributed to different jobs. It is clear that impulses go to the polarized relays successively from the distributer and, provided all of the workmen are assigned to the same job, it is evident that the impulses coming from the various conducting segments of the distributer will pass successively through the actuating mechanism of the register assigned to this job. On account of this successive feature of the actuations of the various registers, it becomes possible to totalize the actuations in the total register JT, the actuating mechanism of this register receiving an impulse whenever any one of the job registers receives an impulse.

Now let us assume that the works manager desires to be warned when the costs on any particular job have reached a predetermined figure. Under these circumstances the plug $w$ of any warning register is inserted in the appropriate jack associated with the job register, as, for example, $J^5$, as shown in Fig. 1. By the insertion of this plug, connection between the spring contacts 83 and 84 is broken and the contact 82 is brought into electrical connection with the sleeve of the plug $w$ and the spring contact 84 is brought into connection with the tip of the plug. It is now clear that the current, instead of passing from the conductor 79 through the conductor 81 and the contacts 83 and 84 to the conductor 85, now passes from the conductor 79 through the sleeve contact 82 then through the sleeve of the plug $w$, through the conductor 90, then through the electromagnetic device associated with the register JW, through the conductors 91 and 95, then through the switch blades 45 and 46 and the conductor 96 to the tip of the plug $w$. It then passes through the tip contact 84 to the conductor 85 from which point its path is the same as described in connection with the register $J^1$.

The electromagnetic actuating mechanism associated with the register JW is such that instead of causing the register to accumulate, it is decumulated. When, for example, the manager desires to be warned when the wages on job $J^5$ reach $12.00, he manually sets up the register JW to indicate that amount. If the plug $w$ is inserted in the jack associated with the register $J^5$, as the latter register is accumulated the register JW is correspondingly decumulated.

It is evident that if the register JW was set to indicate 1200 to correspond with $12.00, it would be necessary to actuate the register 1200 times to decumulate it to zero. As described above, however, the cam 39 is associated with the thousands indicating wheel and the portion 39$^a$ of the cam causes the vertical member 40 to be raised when this indicating wheel shows 9. It is now clear that, in order to move the thousands indicating wheel, it would be necessary to decumulate the register 1201 times. In order to avoid needless complication, the numbers on the units wheel are therefore moved one space with respect to the cam operating the carry over pinion. Figs. 3 and 6 show this one-space displacement of the numbers on the units wheel 9. When the carrying wheels of the register are, therefore, at their zero position, the actual indication is 0001, as clearly shown in Fig. 4. In this way it is obvious that if the number 1200 were set up in a register, the real indication should be 1199, but it will now require 1200 actuations in order to actuate the thousands indicating wheel so that it will be moved one space. It is evident that after the 1200th actuation, the reading of the register would be 9,990. When this operation takes place the switch blades 45 and 46 are separated and 47 and 48 are brought into contact on account of the vertical upward movement of the member 40. By means of this operation the light L shines and the bell R is rung. On account of the separating of the contacts 45 and 46, it is clear that the circuit in which the job register and all of the wage registers which may be associated with this job register, is included, is broken and the further actuation of these registers is thereby stopped. In order to prevent such stoppage in the job and wage registers, the switch 94 is provided which, if closed, connects the conductor 96 directly with the conductor 91 through the conductor 93 and 103. By thus shunting the current, it is clear that although the warning is given by means of the light and the bell, the job and wage registers associated therewith continue to be actuated.

In Figs. 8, 9 and 10 a modification of my system is shown, Fig. 8 being a diagrammatic representation of the application of this modification to the system as a whole, and Figs. 9 and 10 showing the detailed mechanism employed. This detailed mechanism will first be described and the operation of the system as a whole will then be considered.

In Figs. 9 and 10 are shown two views of the electromagnetic actuating mechanism for a wage register. Energizing windings 104 and 105 of an electromagnet are mounted on cores 106 and 107, which cores are connected at one end by a magnetic yoke 108. The cores 106 and 107 are threaded at their working ends and have secured thereto by means of the adjusting nuts 109 and 110, a non-magnetic yoke 111, from the middle of which are depending ears 112 and 113 so formed as to support the pivots 114 and 115 used to suspend the armature 116. The pivot 115 is adjustable as indicated, being held in position by the locking nut 117. The armature 116 has rigidly secured thereto an arm or lever 118 which extends around the ear 113 and upward in front of the windings 104 and 105. At its upper end the arm 118 is provided with a slot 119. The yoke 111 which supports the armature 116 may be moved relatively to the windings 105 and 104 by loosening the nuts 109 and 110 and the amount of motion imparted to the armature 116 may be changed as desired. A hole 120 is formed in the arm 118 to facilitate adjusting the pivot screw of the armature. The character of operation imparted to the armature 116 may be determined by polarizing the armature by means of a permanent magnet 121. The register 122 is suitably mounted on the permanent magnet 121. This register may be of any well known type, the construction of the indicating wheels being similar to that illustrated in Figs. 2 to 7 inclusive. The indicating wheels of the register are loosely mounted on the shaft 123. The ratchet 124 is rigidly connected to the units indicating wheel by means of the sleeve 125. Loosely mounted on the shaft 123 is the flat plate 126. Secured to the lower portion of this plate is a pin 127 adapted to operate in the groove 119 of the arm 118. Pivoted to the right hand portion of the plate 126, as shown in Fig. 9, is the pawl 128 held in engagement with the ratchet 124 by means of a spring 129. A second pawl 130 engages the ratchet 124 and is for the purpose of preventing rotation in a contra-clockwise direction. Rigidly attached to the electromagnet device is an insulating block 131 in which are rigidly mounted the spring terminals 132 and 133 of a switching device, these terminals being provided respectively with the contacts 134 and 135. In its normal position the spring terminal 132 is separated from the terminal 133.

The operation of this actuating mechanism will now be clearly understood. When the current is caused to flow through the windings 104 and 105 in one direction the armature 116 is attracted to the position shown in Fig. 9, and the plate 126 is moved by the arm 118 into the position shown in full lines. The pin 127 operates on the spring terminal 132 and moves it into such a position that the contacts 134 and 135 are held together. If the current is now caused to flow through the windings 104 and 105 in the opposite direction, the armature 116 is attracted into its alternate position and the arm 118 is swung to the right thereby moving the plate 126 into the position shown in dotted lines in Fig. 9. By this movement the pin 127 is carried into such a position that the spring terminal 132 is released and the electrical connection between contacts 134 and 135 is broken. Simultaneously the pawl 128 is moved into engagement with the next tooth of the ratchet 124, movement of the ratchet being prevented by means of the pawl 130. It is now clear that when the current again flows through the windings 104 and 105 in the direction first mentioned the armature 116 will resume the position shown in Fig. 9 and the ratchet 124 will be moved one space in a clockwise direction thereby correspondingly actuating the accounting register 122. The application of this actuating device to the modification of my system shown in Fig. 8, will now be clearly understood. The operation of the rate disks 56 and the distributer 72 is exactly the same as described in connection with Fig. 1 and the electrical connections with the batteries 52 and 65 are precisely the same. Instead of using a polarized relay 61, however, the polarized electromagnetic actuating mechanism shown in Figs. 9 and 10 is used directly in connection with the wage registers. The conductor 60 leading from the brush 59 adapted to form contact with the conducting segment of a rate disk is connected with the windings of one of the electromagnets of the actuating mechanism. The current may be traced from the conductor 60 through this winding, then through the conductor 136 to the windings of the second electromagnet and then through the conductor 64 back to the battery 52. When the windings of the electromagnetic device are energized by the current flowing from the battery 52, the armature 116 is attracted into the position shown in Figs. 9 and 10. The current coming from the battery 65 may be traced through the distributing device and the conductor 73 to one of the windings of the electromagnetic actuating device. The current then passes through the conductor 137 to the second winding of the actuating mechanism. These windings are entirely independent of the windings through which the current flows from the battery 52. From the second winding of the electromagnetic device the current passes through the conductor 138 and then through the terminals 133 and 132 (the contacts 134 and 135 being in electrical connection) to the conductor 78. From this point the current follows exactly the same path as described in connection with the system illustrated in Fig. 1.

Inasmuch as the current flowing through the distributer mechanism from the battery 65 is of opposite sign from that flowing through the rate disks from battery 52, it is evident that on energization of the windings of the electromagnetic actuating device, the armature will be attracted into its alternate position and the contacts 134 and 135 will be separated from each other. It is now apparent that in this modification of my invention, in order to actuate a wage register, the electromagnetic device must be energized alternately by the current flowing through a rate disk and the current flowing through the distributer mechanism. Whereas in the system illustrated in Fig. 1, the wage register and the job register with which it is connected are actuated simultaneously by the flow of an electric impulse from the battery associated with the distributer mechanism, according to the system illustrated in Fig. 8, the wage register is actuated when an electric connection is made with the battery 52 through a rate disk, this connection being either regular or intermittent and the associated job register is actuated when the circuit associated with the battery 65 is closed.

The system of connections for the job registers and warning registers, used in connection with the system shown in Fig. 8, is exactly the same as shown in Fig. 1 and for the sake of simplicity has been omitted from the drawing.

Thus far I have described the use of this scheme in a wage and job accounting system. Applying it to the counting of copies turned out by a printing press, for instance, the disks 56 would have to be associated with the printing presses in such a manner as to cause the flow of an impulse for every copy turned out. The registers WA, WB, WC, WD, WE and WF, connected with these disks 56, would therefore receive an actuation for every copy. If two or more printing presses are working on one edition, and if it is desired to get the total of their output, it is only necessary to make the well-known connection with one of the registers $J^1$ to $J^6$; and owing to the peculiar arrangement of the circuit in this scheme, a total will be secured irrespective of the rate of speed or a possible simultaneous flow of impulses from the individual printing press disks. Having set the desired number of copies on the monitory register, and made the connections with the respective job registers, as above described, the presses may be permitted to run indiscriminately until the contact plates 47 and 48 close the circuits, thereby operating the signal, and announcing that the desired number of copies have been turned out.

Many changes can be made in the detailed construction and operation of the apparatus described herein without departing from the spirit of my invention.

What I claim as new and desire to cover by United States Letters Patent is:

1. In combination, an accounting register provided with numeral wheels and carry-over mechanism, electromagnetic means for actuating said register, a warning signal adapted to be automatically operated when said register has been actuated a predetermined amount, and electro-magnetic means independent of said register for controlling the amount of such predetermined actuation.

2. In combination, an accounting register provided with numeral wheels and carry-over mechanism, means for actuating said register by a step-by-step movement, means for automatically stopping the actuating mechanism of the register when said register has been actuated a predetermined amount, and manually adjustable electromagnetically operated means independent of said register for controlling the amount of such predetermined actuation.

3. In combination, an accounting register provided with numeral wheels and carry-over mechanism, means for actuating said register, a warning signal, and electromagnetic means for simultaneously operating said signal and stopping the actuating mechanism of the register when said register has been actuated a predetermined amount.

4. In combination, a source of electric impulses, an accounting register provided with numeral wheels and carry-over mechanism, an electro-magnetic actuating device for said register, means for connecting said actuating device with said source of impulses, a warning signal, and electro-magnetic means for operating said signal after said register has been actuated a predetermined amount.

5. In combination, a source of electric impulses, an accounting register, an electromagnetic actuating device for said register, means for connecting said actuating device with said source of impulses, a warning signal, and electromagnetic means for simultaneously operating said signal and stopping the actuating device of the register when said register has been actuated a predetermined amount.

6. In combination, a source of electric impulses, an accounting register, an electromagnetic actuating device for said register, means for connecting said actuating device with said source of impulses, a warning signal, circuit-connections for said signal, and electromagnetic means for automatically closing the signal-circuit and opening the register-circuit when said register has been actuated a predetermined amount.

7. In combination, an accounting register, an actuating mechanism for said register, a source of power, means connecting said actuating device with said source, a warning register, a decumulating actuating device associated with said register, means for connecting the actuating device of said warning register with said source of power, a warning signal, and means for operating said signal when said warning register is decumulated a predetermined amount.

8. In combination, an accounting register, an actuating mechanism for said register, a source of power, means connecting said actuating device with said source, a warning register, a decumulating actuating device associated with said register, means for connecting the actuating device of said warning register with said source of power, a warning signal, and means for operating said signal when said warning register is decumulated to zero.

9. In combination, an accounting register, an actuating device for said register, a source of power, means connecting said actuating device with said source of power, a warning register adapted to be set to a predetermined amount, a decumulating actuating mechanism associated with said warning register, means connecting said mechanism with said source of power, the actuating mechanism of said accounting register and the decumulating mechanism of said warning register adapted to be operated at the same rate, a warning signal, means for operating said warning signal when said warning register is decumulated a predetermined amount, and means for simultaneously stopping the actuation of said accounting register.

10. In combination, an accounting register, an actuating device for said register, a source of power, means connecting said actuating device with said source of power, a warning register adapted to be set to a predetermined amount, a decumulating actuating mechanism associated with said warning register, means connecting said mechanism with said source of power, the actuating mechanism of said accounting register and the decumulating mechanism of said warning register adapted to be operated at the same rate, and means for stopping the actuation of said accounting register when said warning register is decumulated a predetermined amount.

11. In combination, an accounting register, an electromagnetic actuating mechanism associated with said register, a source of electric current, means connecting said actuating mechanism with said source of current, a warning register, an electromagnetic decumulating mechanism associated with said register, means for connecting the decumulating mechanism for said warning register in the same circuit with the actuating mechanism for said accounting register, a warning signal, and means for operating said signal when said warning register has been decumulated a predetermined amount.

12. In combination, an accounting register, an electromagnetic actuating mechanism associated with said register, a source of electric current, means connecting said actuating mechanism with said source of current, a warning register, an electromagnetic decumulating mechanism associated with said register, means for connecting the decumulating mechanism for said warning register in the same circuit with the actuating mechanism for said accounting register, and means for simultaneously operating said signal and stopping the actuations of said accounting register when said warning register has been decumulated a predetermined amount.

13. In combination, a source of power, a second source of power, a power-transmitting device operated by the alternate action of said first and second sources of power, and a register controlled by said device.

14. In combination, a source of electric impulses, a second source of electric impulses, impulse-transmitting mechanism, means for connecting said mechanism with said first source of impulses, means for connecting said mechanism with said second source of impulses, said mechanism being adapted to be actuated from either source to transmit an impulse from one source upon receiving an impulse from the other source, and a register controlled by said mechanism.

15. In combination, an accounting register, an electromagnetic actuating mechanism associated with said register, a pair of sources of electric impulses, and means for connecting said actuating mechanism with one source of impulses after the flow of an impulse from said second source of impulses.

16. In combination, an accounting register, an electromagnetic actuating mechanism associated with said register, a pair of sources of electric impulses, and means for sending a single impulse to said actuating mechanism on the alternate flow of an impulse from each of said sources.

17. In combination, an accounting register, an electromagnetic actuating mechanism associated with said register, a pair of sources of electric impulses, and means for connecting said actuating mechanism with one source of impulses after the flow of an impulse from said second source of impulses, said connection with said first source being automatically broken before the flow of an impulse from said second source.

18. In combination, an accounting register, an electromagnetic actuating mechanism associated with said register, a source of periodic electric impulses, a source of intermittent electric impulses, means connecting the actuating mechanism of said register to said source of periodic impulses, a switch mechanism adapted to break the connection of said actuating mechanism with said source of periodic impulses, means for breaking said connection after a flow of an impulse from said source, and means connecting said source of intermittent impulses with said switch mechanism, an impulse from said intermittent source adapted to restore the connection between the actuating mechanism of said register and said source of periodic impulses.

19. In combination, a wage-register, a job-register, actuating mechanism for each of said registers, a source of impulses, means for connecting said registers with said source of impulses, means for automatically breaking said connection after an impulse has been transferred to said actuating mechanism, and means separate from said source of impulses for restoring said connection after it has been broken.

20. In combination, a wage-register, a job-register, actuating mechanism for each of said registers, a source of electric current, circuit-connections leading therefrom, commutator mechanism included in said circuit-connections for sending electric impulses over the line, a circuit-controlling device independent of said commutator mechanism for connecting said registers in circuit, said device automatically breaking the connection after an impulse has been transmitted through the register, and means for restoring said connection after it has been broken.

21. In an accounting system, a wage register, an electromagnetic actuating mechanism for said register, a source of electric impulses, means connecting said actuating mechanism with said source, a switch mechanism adapted to break said connection, an electromagnetic device associated with said switch mechanism, said connecting means in circuit with one set of windings of said electromagnetic device, the energization of said windings opening said switch, a second source of impulses of a rate corresponding to a predetermined rate of wages, and means connecting said second source with a second set of windings of the electromagnetic device associated with said switch mechanism, the energization of said second set of windings by said source closing said switch.

22. In an accounting system, a wage register, a job register, an electromagnetic actuating mechanism for each of said registers, means for including the actuating mechanisms of said registers in the same circuit, a source of electric impulses, means connecting said actuating mechanism with said source, a switch mechanism adapted to break said connection, an electromagnetic device associated with said switch mechanism, said connecting means in circuit with one set of windings of said electromagnetic device, the energization of said windings opening said switch, a second source of impulses of a rate corresponding to a predetermined rate of wages, and means connecting said second source with a second set of windings of the electromagnetic device associated with said switch mechanism, the energization of said second set of windings by said source closing said switch.

23. In an accounting system, a plurality of wage registers, an electromagnetic actuating device associated with each register, a source of electric current, a segmented distributer, means for successively connecting the segments of said distributer with said source of current, a switch associated with each of said wage registers, an electromagnetic device associated with said switch, means connecting each of said switches with a segment of said distributer, said connecting means including the windings of the electromagnetic device associated with each switch, the energization of said electromagnetic device by said source serving to open the switch, means connecting each switch with the actuating mechanism of the register with which said switch is associated, a second source of current, a plurality of impulse making devices connected with said source, each device adapted to impart impulses at a rate corresponding to a predetermined rate of wages, and means for including independent windings of each electromagnetic device associated with each switch in the circuit with any of said impulse making devices, the energization of said electromagnetic device by said second source adapted to close said switch, the closure of said switch thereby allowing an impulse to flow from said first source of current to the actuating mechanism of its associated wage register on connection of the proper segment of said distributer with said source.

24. In an accounting system, a plurality of wage registers, a plurality of job registers, an electromagnetic actuating device associated with each register, means for connecting the actuating mechanism of any job register in the same circuit with the actuating mechanism of any wage register, a source of electric current, a segmented distributer, means for successively connecting the segment of said distributer with said source of current, a switch associated with each of said wage registers, an electromagnetic device associated with said switch, means connecting each of said switches with a segment of said distributer, said connecting means including the windings of the electromagnetic device associated with each switch, the energization of said electromagnet by said source serving to open the switch, means connecting each switch with the actuating mechanism of the register with which said switch is associated, a second source of current, a plurality of impulse making devices connected with said source, each device adapted to impart impulses at a rate corresponding to a predetermined rate of wages, and means for including independent windings of each electromagnetic device associated with each switch in the circuit with any of said impulse making devices, the energization of said electromagnetic device by said second source adapted to close said switch, the closure of said switch thereby allowing an impulse to flow from said first source of current to the actuating mechanism of its associated wage register on connection of the proper segment of said distributer with said source.

25. In an accounting system, a wage register, a job register, an electromagnetic actuating mechanism associated with each of said registers, a source of impulses, a switch associated with the actuating mechanism of each wage register, means for including a set of windings of the actuating mechanism of said wage register, said switch, the actuating mechanism of said job register, and said source of impulses in the same circuit, the energization of said circuit adapted to simultaneously open said switch and actuate said job register, a second source of impulses, and means connecting said second source with a second independent set of windings of the actuating mechanism of said wage register, the energization of said second set of windings adapted to close said switch and actuate said wage register.

26. In an accounting system, a plurality of wage registers, a plurality of job registers, a polarized electromagnetic actuating device associated with each of said wage registers, an electromagnetic actuating device associated with each of said job registers, a source of current, a segmented distributer, means for successively connecting the segments of said distributer with said source of current, a switch associated with the actuating mechanism for each of said wage registers, means for including the actuating mechanism of any job register, any of said switches, a set of windings of the polarized electromagnetic actuating device associated with said switch, and one of the segments of said distributer in the same circuit, energization of said circuit adapted to simultaneously actuate said job register, open said switch, and throw the actuating mechanism of said wage register in position to be actuated, a second source of current, a plurality of impulse making devices connected with said source, means for actuating each of said devices at a rate corresponding to a predetermined rate of wages, and means connecting any of said devices with a second set of windings of the polarized actuating mechanism of any wage register, energization of said windings by said second source adapted to close said switch and actuate said wage register.

27. In a warning register, the combination of a plurality of indicating wheels, carry-over mechanism associated with said wheels, means for removing said carry-over mechanism from engagement with said wheels, thereby enabling manual adjustment of said indicating wheels, and a switch directly actuated by said register.

28. In a warning register, the combination of a plurality of indicating wheels, carry-over mechanism associated with said wheels, means for removing said carry-over mechanism from engagement with said wheels, thereby enabling manual adjustment of said indicating wheels, and a switch directly actuated by said register when it is decumulated a predetermined amount.

29. In a warning register, the combination of a plurality of indicating wheels, carry-over mechanism associated with said wheels, means for removing said carry-over mechanism from engagement with said wheels, means for retaining said wheels in the positions to which they are adjusted, and a switch directly actuated by said register.

30. In a warning register, the combination of a plurality of indicating wheels, carry-over mechanism associated with said wheels, means for removing said carry-over mechanism from engagement with said wheels, thereby enabling manual adjustment of said indicating wheels, and a switch actuated by one of said indicating wheels.

31. In a warning register, the combination of a plurality of indicating wheels, carry-over mechanism associated with said wheels, means for removing said carry-over mechanism from engagement with said wheels, a cam associated with one of said indicating wheels, said cam adapted to actuate a switch breaking device when said register is decumulated a predetermined amount.

32. In a warning register, the combination of a plurality of indicating wheels, carry-over mechanism associated with said wheels, means for removing said carry-over mechanism from engagement with said wheels, thereby enabling manual adjustment of said indicating wheels, and means associated with one of said indicating wheels for directly actuating a switch.

33. In a warning register, the combination of a plurality of indicating wheels, carry over mechanism associated with said wheels, means for removing said carry-over mechanism from engagement with said wheels, thereby enabling manual adjustment of said indicating wheels, a cam associated with one of said indicating wheels, said cam adapted to actuate a switch breaking device when said register has been decumulated beyond zero.

34. In a warning register, the combination of a plurality of indicating wheels, carry-over mechanism associated with said wheels, means for removing said carry-over mechanism from engagement with said wheels, thereby enabling manual adjustment of said indicating wheels, a cam associated with the indicating wheel of highest order for actuating a switch breaking mechanism when said register has been decumulated beyond zero.

35. In a warning register, a plurality of indicating wheels, a series of numbers on the periphery of each wheel, carry-over mechanism associated with said indicating wheels, means for removing said carry-over mechanism from engagement with said wheels, thereby enabling manual adjustment of said indicating wheels, the numbers on the units indicating wheel arranged in such position that the number of actuations required to actuate the wheel of highest order one number beyond zero will correspond to the number indicated on the register, a cam associated with the indicating wheel of highest order, a switch-breaking mechanism associated with said register, and means actuated by said cam for operating said switch-breaking mechanism on the movement of the indicating wheel of highest order.

36. In a register, the combination of a plurality of numeral wheels, a carry-over pinion associated with each wheel, and a carry-over member on each wheel, said carry-over member adapted to coöperate with said carry-over pinion to actuate a numeral wheel after the numeral wheel of next lower order has been actuated a predetermined amount, the carry-over member on the units numeral wheel being placed in a different position relative to the numerals from the carry-over members of the other numeral wheels, said shifting of the position of the carry-over member adapted to correspondingly change the number of actuations required to move the numeral wheel of next higher order.

37. In combination, a switching device, a source of power adapted to operate said switching device in one direction, a second source of power adapted to operate said switching device in the reverse direction, and a register associated with said switching device, said register adapted to be actuated by the movement of said switching device in a given direction.

38. In combination, a plurality of switching devices, a source of power adapted to simultaneously actuate said switching devices in one direction, and a second source of power adapted to successively operate the switching devices in the reverse direction.

39. In combination, a source of power, a plurality of switching devices, said source of power adapted to close the switches of said switching devices, a register associated with each switching device, an actuating mechanism associated with each register, a second source of power, and means for successively actuating said registers and said switching devices by said second source.

40. In combination, a plurality of totalizing registers, a plurality of individual registers adapted to be connected with any of said totalizing registers, means for actuating the individual registers at irregular intervals, and means for successively totalizing the actuations of the individual registers in the connected totalizing register.

41. In an accounting system, a source of power, an indicating register, electro-magnetic actuating mechanism for said register, and means for intermittently connecting said actuating mechanism with said source of power for a predetermined number of step-by-step actuations of said register.

42. In an accounting system, a time-controlled source of power, a wage-register, actuating mechanism for said wage-register, and means for intermittently connecting said actuating mechanism with said source of power for a predetermined number of step-by-step actuations of said wage-register.

43. In an accounting system, a source of electric impulses, an indicating register, electromagnetic actuating mechanism for said register, means for connecting said actuating mechanism with said source of impulses for actuating the register for a step-by-step movement, and electro-magnetic means for automatically interrupting said connection when the register has been actuated a predetermined amount.

44. In an accounting system, a source of power, an indicating register, actuating mechanism for said register, means for connecting said actuating mechanism with said source of power for a predetermined amount of actuation of said register, and electromagnetic means for controlling the rate of actuation of said register.

45. In an accounting system, a source of power, an indicating register, actuating mechanism for said register, means connecting said actuating mechanism with said source of power, a second means for connecting said actuating mechanism with said source of power, means associated with said second connecting means for interrupting the connection of said register with said source after the register has been actuated a predetermined amount, and means for selectively connecting the actuating mechanism of said register with said source through the first or second connecting means.

46. In an accounting system, a source of power, an indicating register, actuating mechanism for said register, means for connecting said actuating mechanism with said source of power, a second electro-magnetic means for connecting said actuating mechanism with said source of power only during a predetermined number of actuations of said register, and means for varying the rate of actuation of said register.

47. In an accounting system, a source of electric impulses, an indicating register adapted to be actuated by said impulses by a step-by-step movement, means for connecting said register with said source of impulses, a second means for connecting said register with said source of impulses for only a predetermined number of actuations, and means for selectively connecting said register with said source of impulses through either the first or the second connecting means.

48. In combination, a plurality of registers, means for actuating the same, a signal device, and means for selectively associating said signal device with any desired register to be automatically operated when the register has been actuated a predetermined amount.

49. The combination of a plurality of electromagnetically actuated registers, a controlling device for said registers, and means for operatively associating said controlling device with any desired register to automatically interrupt the register circuit when said register has been actuated a predetermined amount, said controlling device being adjustable to vary such predetermined amount.

50. The combination of a source of electric impulses, a plurality of registers adapted to be connected with said source for actuation, a jack associated with each register, a signal device provided with a plug, and connections whereby said plug may be inserted in any of said jacks to cause automatic operation of the signal when the connected register has been actuated a predetermined amount.

51. The combination of a source of electric impulses, a plurality of registers adapted to be connected with said source for actuation, a jack associated with each register, a controlling device provided with a plug, and connections whereby said plug may be inserted in any of said jacks to cause automatic stopping of the connected register when the same has been actuated a predetermined amount, said controlling device being adjustable to vary such predetermined amount.

52. The combination of a register, electromagnetic means for actuating the same, a controlling device for automatically stopping the actuation of the register when said register has been actuated a predetermined amount, and plug-and-jack connections between the register and the controlling device.

53. The combination of a register, electromagnetic means for actuating the same, a controlling device for automatically stopping the actuation of the register when said register has been actuated a predetermined amount, said controlling device being manually adjustable to vary such predetermined amount, and plug-and-jack connections between the register and the controlling device.

54. The combination of a register, time-controlled mechanism for actuating at a predetermined rate, and manually-controlled means for automatically limiting said actuations to a predetermined amount.

55. The combination of a register, time-controlled mechanism for actuating the same at a predetermined rate, manually-controlled means for automatically limiting said actuations to a predetermined amount, and a signal associated with said manually-controlled means to be operated when such predetermined amount has been reached.

56. The combination of a register, time-controlled mechanism for actuating the same at a predetermined rate for only a given interval, and a signal device adapted to be automatically operated when the actuations of the register have reached said predetermined amount.

57. The combination of a register, time-controlled mechanism for actuating the same at a predetermined rate for only a given interval, a signal device adapted to be automatically operated when the actuations of the register have reached said predetermined amount, and means for adjusting said signal device to vary such predetermined amount.

58. The combination of a time-controlled register, a manually-controlled register, and connections between said registers whereby the actuations of said time-controlled register are limited in accordance with the set-up in said manually-controlled register.

59. The combination of a plurality of registers, time-controlled mechanism for actuating the same, and manually-controlled means adapted to be associated with any desired register for automatically limiting the actuations of said register to a predetermined amount.

60. The combination of a plurality of time-controlled registers, a manually-controlled register, and means for selectively connecting said manually-controlled register with any desired time-controlled register to automatically limit the actuations of the latter in accordance with the set-up in the manually-controlled register.

61. The combination of an electro-magnetically actuated register, an actuating circuit therefor, an electric signal, circuit connections for said signal, and electro-magnetic means for opening the register-circuit and closing the signal-circuit when the register has been actuated a predetermined amount.

62. The combination of a source of electric impulses, a circuit connected therewith, a translating device in said circuit, and means for automatically interrupting said circuit after a predetermined number of impulses have passed through said translating device.

In witness whereof, I hereunto subscribe my name this 5th day of June, A. D. 1909.

FREDERICK O. HEUSER.

Witnesses:
 LEONARD W. NOVANDER,
 HENRY M. HUXLEY.